United States Patent [19]

Van Hout et al.

[11] Patent Number: 4,993,674

[45] Date of Patent: Feb. 19, 1991

[54] CLIP STRUCTURE FOR MOUNTING VEHICLE TELEPHONE MICROPHONE

[75] Inventors: James E. Van Hout, Auburn Hills; David R. Baehr, Detroit, both of Mich.

[73] Assignee: Chrysler Corporation, Highland Park, Mich.

[21] Appl. No.: 525,005

[22] Filed: May 18, 1990

[51] Int. Cl.⁵ .............................................. A47B 96/06
[52] U.S. Cl. .................................... 248/229; 224/312; 248/231.7
[58] Field of Search ............... 248/229, 231.7, 214, 248/316.7, 314, 51, 309.1; 224/42.45 R, 312; 379/446; 24/564, 545, 547, 555

[56] References Cited

U.S. PATENT DOCUMENTS

| | | | |
|---|---|---|---|
| 2,597,275 | 5/1952 | Ahlstrand | 248/231.8 X |
| 4,040,547 | 8/1977 | Dickey | 248/229 X |
| 4,088,848 | 5/1978 | Weed | 248/309.1 X |
| 4,193,572 | 3/1980 | Horiuchi | 248/231.8 X |
| 4,326,653 | 4/1982 | Stone | 224/312 |
| 4,678,153 | 7/1987 | Maddock | 248/229 |
| 4,887,753 | 12/1989 | Allen | 224/312 |

FOREIGN PATENT DOCUMENTS

| | | | |
|---|---|---|---|
| 1092074 | 12/1980 | Canada | 248/229 |
| 2817933 | 8/1979 | Fed. Rep. of Germany | 248/229 |

Primary Examiner—J. Franklin Foss
Attorney, Agent, or Firm—Edward A. Craig

[57] ABSTRACT

The clip structure is provided for securing the microphone of a vehicle telephone in a position beneath the forward marginal edge portion of a vehicle headliner with a microphone cable extending around the forward edge of the vehicle headliner into the space between the vehicle headliner and the vehicle roof structure. The clip structure includes means for securing the microphone in place, means for securement of the structure to the headliner and means for retaining the microphone cable in place.

6 Claims, 1 Drawing Sheet

CLIP STRUCTURE FOR MOUNTING VEHICLE TELEPHONE MICROPHONE

BACKGROUND OF THE INVENTION

1. Field of Art

The present invention relates to a clip structure for securing the microphone of a vehicle telephone to the forward marginal edge portion of a vehicle headliner.

2. Prior Art

Cellular telephones have become a popular accessory item for vehicles. Current technology has permitted the desired use of such telephones in vehicles at a relatively low cost as compared with previous vehicle telephone systems.

One problem which has been encountered with vehicle telephones is the use of a handset of the type commonly used in office and home telephones for transmitting and receiving. The use of handsets is inconvenient for a driver. Desirably, a hands-free telephone system is preferred. This is currently being accomplished by stationary mounting of the receiver element and the transmitter element in a position in the forward compartment of a vehicle adjacent the driver's seat thereby permitting the driver to use the telephone without the inconvenience of holding a handset.

One type of transmitter currently being used for this purpose is a microphone mounted by means of bracket structure at the forward edge of the vehicle headliner or on the sunvisor. Prior art mounting structure has included three clip elements generally formed of sheet metal. These elements include a clip which attaches to either the headliner or visor, a second clip which mounts the microphone component, and a third clip for routing the microphone cable. Such mounting structure is visually objectionable in that is consists of three separate components not integrated into the vehicle interior design. Assembly is also somewhat costly in that three separate parts have got to be mounted by the assembly worker.

The present invention provides a single clip structure which incorporates three functionally independent clips molded into one unit. The structure is securable to the forward marginal edge of the vehicle headliner in a position convenient for use by the driver. The clip structure is desirably molded from a plastic material which results in an aesthetically appealing rounded structure. The clip structure includes an integrally formed channel that mounts the microphone cable above the headliner. The channel positively captures the microphone cable and protects it from damage by providing generous strain relief and a protective housing structure. Further, the channel permits right, left or straight-out cable routing.

SUMMARY OF THE INVENTION

A clip structure is provided for securing the microphone of a vehicle telephone in a position beneath the forward marginal edge portion of a vehicle headliner with the microphone cable extending around the forward edge of the vehicle headliner into the space between the headliner and the vehicle roof structure.

The clip structure comprises a first clip portion including an upper arm and a lower arm connected together by a flexible web to define a generally U-shaped structure receivable on the forward marginal edge portion of a vehicle headliner with said upper arm lying over the forward marginal edge portion of the vehicle headliner and said lower arm lying under the forward marginal edge portion of the vehicle headliner and with both arms pressing against the vehicle headliner.

A second clip portion depends from the lower arm of the first clip portion for receiving and engaging the microphone of a vehicle telephone.

A microphone cable guide wall is positioned above the upper arm of the first clip portion in spaced apart relationship thereto. The microphone cable guide wall extends substantially parallel to said upper arm. A rib is provided between the cable guide wall and upper arm. The rib extends longitudinally of the cable guide wall and upper arm. A microphone cable retaining structure depends from at least one side edge of the microphone cable guide wall towards said upper arm and terminates short thereof. The microphone cable retaining structure permits a length of microphone cable to be squeezed thereby into the space between the microphone cable guide wall and upper arm with the rib and microphone cable retaining structure thereafter preventing escape of the microphone cable.

The rib is preferably located substantially centrally of the microphone cable guide wall and upper arm. Microphone cable retaining structure is preferably provided on each side edge of the microphone cable guide wall whereby a microphone cable can be received on either side of the clip structure. The microphone cable retaining structure desirably includes a ridge depending from each side edge of the microphone cable guide wall. The ridges extend from the forward end of the microphone cable guide wall and terminate short of the rearward end thereof. Preferably, the rib also extends from the forward end of the microphone cable guide wall and terminates short of the rearward end thereof whereby the rearward portion of the microphone cable guide wall is free to flex to facilitate initial insertion of a microphone cable. Further, a microphone cable retaining projection desirably depends from each rearward corner of the microphone cable guide wall.

A pair of longitudinally staggered tangs are desirably provided depending from the underside of the upper arm adjacent to the rearward end thereof to engage the vehicle headliner to retain the clip structure in place thereon.

IN THE DRAWING

DESCRIPTION OF PREFERRED EMBODIMENT

Figure 1:
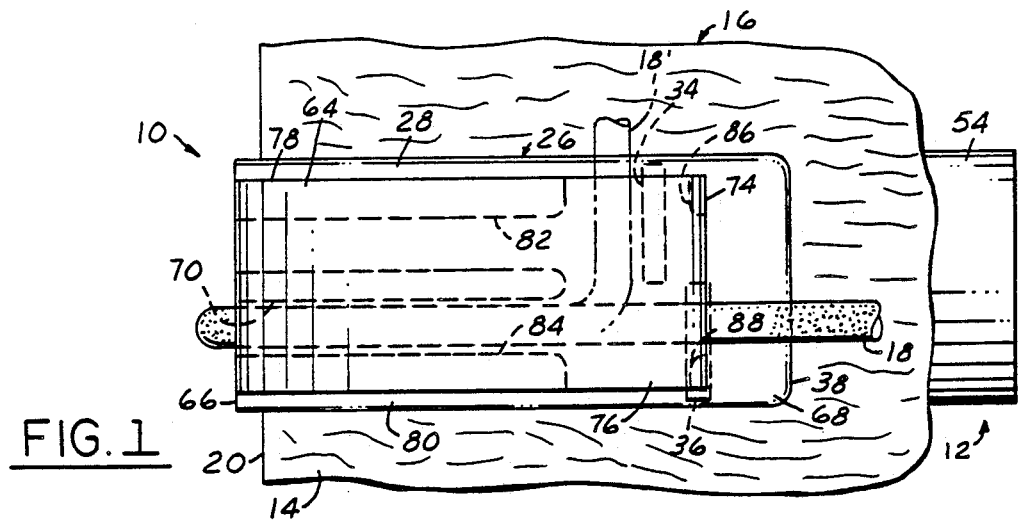
FIG. 1 is a top plan view of one embodiment of the clip structure of the present invention illustratively mounted on the forward marginal edge portion of a vehicle headliner with a microphone secured in place thereon.

Referring to the figures, it will be noted that the clip structure 10 is provided for securing the microphone 12 of a vehicle telephone in a position beneath the forward marginal edge portion 14 of a vehicle headliner 16 with the microphone cable 18 extending around the forward edge 20 of the vehicle headliner 16. The microphone cable 18 extends into the space 22 between the vehicle headliner 16 and the vehicle roof structure, diagrammatically illustrated by the dotted line 24.

Figure 2:
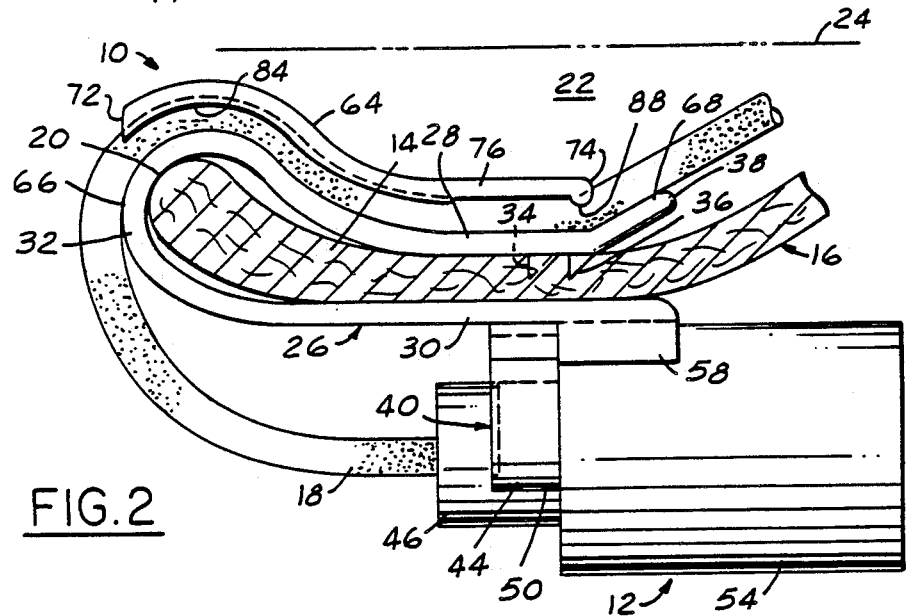
FIG. 2 is a side elevational view of the structure illustrated in FIG. 1.

The clip structure 10 comprises a first clip portion 26. The first clip portion 26 includes an upper arm 28 and a lower arm 30 connected together by a flexible web 32. The clip structure is desirably fabricated of a flexible plastic material such as a urethane. The first clip portion 26 defines a generally U-shaped structure receivable on the forward marginal edge portion 14 of the vehicle headliner with the upper arm 28 lying over the forward marginal edge portion 14 of the vehicle headliner 16 and the lower arm 30 lying under the forward marginal edge portion 14 of the vehicle headliner 16 and with both arms pressing against the vehicle headliner to retain the clip structure in place as illustrated in FIGS. 1 and 2. A pair of longitudinally staggered tangs 34, 36 depend from the underside of the upper arm 28 adjacent to the rearward end 38 thereof to engage the vehicle headliner 16 and securely retain the clip structure 10 in place thereon.

A second clip portion 40 depends from the lower arm 30 for receiving and engaging the microphone 12. The second clip portion 40 includes a pair of circular arms 42, 44 which engage microphone portion 46. Each arm 42, 44 extends over an arc greater than 90 degrees to provide an opening between the ends 48, 50 thereof which is less than the diameter of microphone portion 46 with the consequence that the microphone portion 46 will be securely retained in place. A groove 52 is provided to facilitate flexing of the arms 42, 44 for insertion or retraction of microphone portion 46. The microphone has a second portion 54 of larger diameter than the portion 46. Depending tabs 56, 58 are provided to limit sideward movement of the second microphone portion 54. A rib 60, 62 is provided on the interior of each arm 42, 44 for secure engagement of the microphone portion 46.

A microphone cable guide wall 64 is positioned above the upper arm 28 in spaced apart relationship thereto. The wall 64 is substantially parallel to the upper arm 28 and co-extensive therewith, extending from the forward portion 66 of the web 32 almost to the end of the upper arm 28. As will noted in FIG. 2, the marginal end portion 68 of the upper arm 28 is angled upwardly to facilitate mounting on the headliner and direct the microphone cable 18 upwardly into the space 22. A rib 70 is provided between the cable guide wall 64 and upper arm 28. The rib 70 extends longitudinally of the wall 64 and arm 28 from the forward end 72 of the wall 64 and terminates short of the rearward end 74 of the wall 64. This leaves rearward portion 76 of the wall 64 free to flex to facilitate initial insertion of a microphone cable.

Microphone cable retaining structure depends from the side edges 78, 80 of the microphone cable guide wall 64 towards the upper arm 28. This structure terminates short of the upper arm 28 to permit a length of microphone cable to be squeezed thereby into the space between the microphone cable guide wall 64 and upper arm 28 with the rib 70 and microphone cable guide structure thereafter preventing escape of the microphone cable.

The microphone cable retaining structure includes a ridge 82, 84 depending from each side edge 78, 80. The ridges extend from the forward end 72 towards the rearward end 74 but terminate short of the rearward end 74 approximately at the same point that the rib 70 terminates. A microphone cable retaining projection 86, 88 depends from each rearward corner of the microphone cable guide wall 64. This configuration permits the cable 18 to be routed straight through as shown in full lines in FIG. 1 or to be routed sideways between the end of the rib 70 and one of the projections 86, 88 as shown at $18^1$ in broken lines in FIG. 1. The cable is preferably routed to the opposite side of the clip as illustrated at $18^1$ so that a tug on it will not pull it loose from the clip (the rib 70 preventing this from happening). If the ridges extended all the way to the end, the cable would be pinched when it was routed sidewardly.

Figure 3:
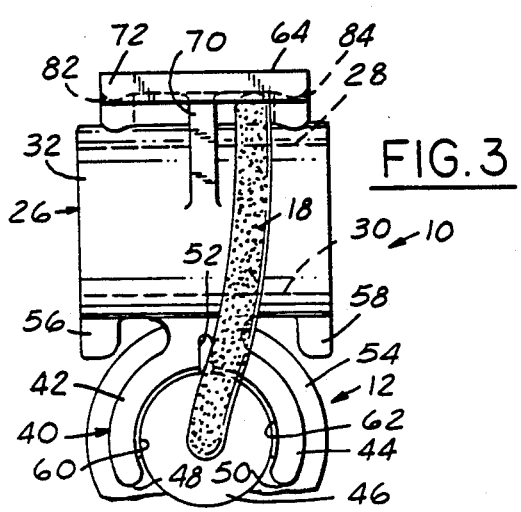
FIG. 3 is a front elevational view of the clip structure illustrated in FIG. 1.
Figure 4:
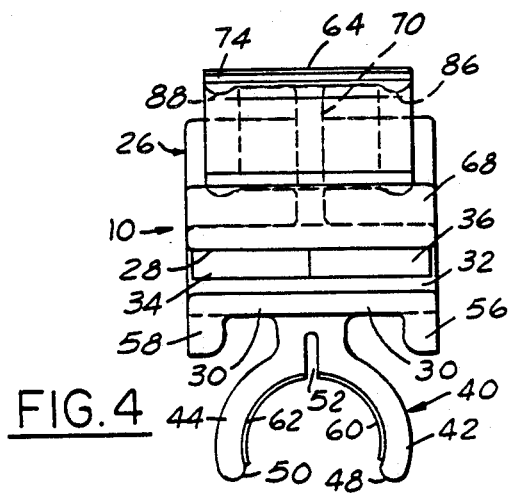
FIG. 4 is a rear elevation view of the clip structure illustrated in FIG. 1 with the microphone removed for the purpose of clarity.

The microphone 12 is mounted by first inserting the cable 18 into one of the channels defined by the rib 70 which is positioned centrally of the upper arm 28 and wall 64. The cable is mounted by first forcing a portion beneath one of the projections 86, 88 and then squeezing the remaining portion beneath one of the ridges 82, 84. The ridges and projections thereafter retain the cable in place. The cable is mounted on one side or the other of the clip structure 10 depending on whether it is to be routed to the left or right of the vehicle. In the event that the cable is to be routed straight back, it can be mounted in either side of the clip structure 10. As will be appreciated, the microphone cable guide wall 64 and upper arm 28 protect the cable from abrasion or other damage, functioning as a kind of housing. At the same time, as will be noted in FIGS. 1, 2, and 3, the cable is permitted some lateral motion thereby relieving stress on the cable. The rounded web 32 also aids in this function. After the cable has been mounted, the clip may be secured to the vehicle headliner 16 and the microphone mounted in the clip portion 40.

We claim:

1. A clip structure for securing the microphone of a vehicle telephone in a position beneath the forward marginal edge portion of a vehicle headliner with the microphone cable extending around the forward edge of the vehicle headliner into the space between the vehicle headliner and the vehicle roof structure, the clip structure comprising a first clip portion including an upper arm and a lower arm connected together by a flexible web to define a generally U-shaped structure receivable on the forward marginal edge portion of a vehicle headliner with said upper arm lying over the forward marginal edge portion of the vehicle headliner and said lower arm lying under the forward marginal edge portion of the vehicle headliner and with both arms pressing against the vehicle headliner, a second clip portion depending from said lower arm for receiving and engaging the microphone of a vehicle telephone, a microphone cable guide wall positioned above said upper arm is spaced apart relationship thereto and extending substantially parallel thereto, a rib is provided between the cable guide wall and upper arm extending longitudinally thereof, and microphone cable retaining structure depending from at least one side edge of the microphone cable guide wall towards said upper arm and terminating short thereof, said microphone cable retaining structure permitting a length of microphone cable to be squeezed thereby into the space between the microphone cable guide wall and upper arm with the rib and microphone cable retaining structure thereafter preventing escape of the microphone cable.

2. A clip structure as defined in claim 1 wherein the rib is located substantially centrally of the microphone cable guide wall and upper arm, and microphone cable retaining structure provided on each side edge of the microphone cable guide wall whereby a microphone cable can be received on either side of the clip structure.

3. A clip structure as defined in claim 2 wherein the microphone cable retaining structure includes a ridge depending from each side of the microphone cable guide wall, said ridges extending from the forward end of the microphone cable guide wall and terminating short of the rearward end thereof to permit the microphone cable to be routed sidewardly without being pinched.

4. A clip structure as defined in claim 1 wherein said rib extends from the forward end of the microphone cable guide wall and terminates short of the rearward end thereof whereby the rearward portion of the microphone cable guide wall is free to flex to facilitate initial insertion of a microphone cable.

5. A clip structure as defined in claim 4 wherein a microphone cable retaining projection depends from each rearward corner of the microphone cable guide wall.

6. A clip structure as defined in claim 1 wherein a pair of longitudinally staggered tangs depend from the underside of said upper arm adjacent to the rearward end thereof to engage a vehicle headliner to retain the clip structure in place thereon.

* * * * *